(12) United States Patent
Weiss et al.

(10) Patent No.: US 6,756,024 B2
(45) Date of Patent: Jun. 29, 2004

(54) METHOD FOR PREPARING LITHIUM AMIDE

(75) Inventors: Wilfried Weiss, Oberursel (DE); Dirk Dawidowski, Frankfurt (DE)

(73) Assignee: Chemetall GmbH, Frankfurt am Main (DE)

( * ) Notice: Subject to any disclaimer, the term of this patent is extended or adjusted under 35 U.S.C. 154(b) by 260 days.

(21) Appl. No.: 10/091,383

(22) Filed: Mar. 5, 2002

(65) Prior Publication Data

US 2002/0188158 A1 Dec. 12, 2002

(30) Foreign Application Priority Data

Mar. 9, 2001  (DE) .......................................... 101 11 725

(51) Int. Cl.$^7$ .............................................. C01B 21/00
(52) U.S. Cl. ..................................................... 423/413
(58) Field of Search ......................................... 423/413

(56) References Cited

U.S. PATENT DOCUMENTS

| | | | | | |
|---|---|---|---|---|---|
| 1,570,467 | A | * | 1/1926 | Ewan | 423/413 |
| 2,202,994 | A | * | 6/1940 | Nieuwland | 423/413 |
| 2,315,830 | A | * | 4/1943 | Vingee et al. | 423/413 |
| 2,490,851 | A | * | 12/1949 | Alexander | 423/413 |
| 2,612,436 | A | * | 9/1952 | Overhoff et al. | 423/413 |
| 3,542,512 | A | * | 11/1970 | Honeycutt | 423/413 |
| 3,987,151 | A | * | 10/1976 | Astrauskas et al. | 423/413 |
| 4,206,191 | A | * | 6/1980 | Morrison et al. | 423/413 |
| 5,486,343 | A | * | 1/1996 | Schwindeman et al. | 423/413 |

* cited by examiner

*Primary Examiner*—Wayne A. Langel
(74) *Attorney, Agent, or Firm*—Fulbright & Jaworski L.L.P.

(57) ABSTRACT

A method for preparing lithium amide is described in which in a first method step lithium metal is reacted with ammonia to form lithium bronze and in a second method step the lithium bronze is reacted with a 1,3-diene or an arylolefin in the presence of a solvent.

8 Claims, No Drawings

METHOD FOR PREPARING LITHIUM AMIDE

The invention relates to a method for preparing lithium amide.

Lithium amide is a strong base. It is often used as a reagent in synthetic organic chemistry, for example in condensation or alkylation reactions (Encyclopaedia of Reagents for Organic Synthesis, Vol. 5, 3031, L. A. Paquette, John Wiley 1995).

Usual preparation methods provide that the lithium metal be dissolved in liquid ammonia (T<−33° C.) and subsequently reacted under the catalysis of a transition metal compound (for example iron III nitrate: Gmelin, Lithium, Supplementary Volume 20, 279) to form lithium amide. The disadvantage of this operation is the low temperature and hydrogen formation.

The reaction of lithium metal and gaseous ammonia at temperatures above 400° C. is also known. The disadvantage of this is the high temperature and hydrogen formation.

U.S. Pat. No. 5,486,343 describes a method for preparing lithium amide in which lithium metal is reacted in a solvent with ammonia to form lithium bronze and subsequently the lithium bronze is thermally decomposed to form lithium amide, hydrogen and ammonia. The disadvantage here is also the release of hydrogen.

The object of the invention is to overcome the disadvantages of the prior art and in particular to provide a method for preparing lithium amide in which no hydrogen is released and which operates, as far as possible, at ambient temperature.

The object is achieved by means of a method for preparing lithium amide in which in a first method step lithium metal is reacted with ammonia to form lithium bronze and in a second method step the lithium bronze is reacted with a 1,3-diene or an arylolefin in the presence of a solvent;

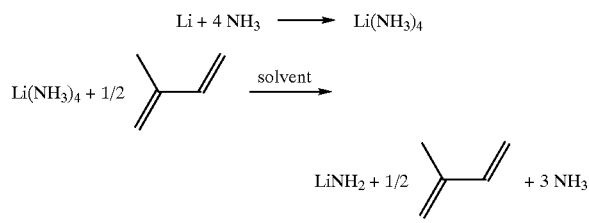

Preferred 1,3-dienes or arylolefins are butadiene, isoprene, piperylene, dimethylbutadiene, hexadiene, styrene, methyl styrene, naphthalene or anthracene.

The first reaction step may be carried out solvent free. However, operations are preferably carried out in a solvent in the first reaction step as well. Acyclic or cyclic aliphatic hydrocarbons, aromatic hydrocarbons or ethers or mixtures of these substances are preferably used as the solvents. Examples of solvents are pentane, cyclopentane, hexane, heptane, octane, cyclohexane, toluene, xylene, cumene, ethyl benzene, tetraline, diethyl ether, tetrahydrofuran (THF), 2-methyl-THF, tetrahydropyran, diisopropyl ether, dibutyl ether, dioxan, methyl-tert-butyl ether or glycol ether. When THF is used as the sole solvent in the first reaction step, it is to be borne in mind that the THF may be subjected to a slow decomposition reaction, whereby ethene and lithium ethanoate are formed.

A preferred temperature of reaction for both reaction steps lies between 0 and 30° C.

The heat of reaction in the first reaction step can be controlled, for example, by way of the rate of dosage of the ammonia. When a solvent is used in the first reaction step, it is possible to dissipate the heat by way of the solvent through jacket cooling. The lithium bronze that is formed then floats on the solvent and can be separated for purification purposes and, if required, stored and transported.

The heat of reaction in the second reaction step can be controlled, for example, by way of the rate dosage of the 1,3 diene or arylolefin. The lithium amide that is formed is insoluble and heavier than the reaction solution. The hydrogenated 1,3 diene or arylolefin is dissolved in the solvent; the ammonia is discharged in gaseous form and can be reclaimed. The powdery lithium amide is separated from the solvent and, if required, dried.

The advantage of the method in accordance with the invention is that the reaction can be carried out at ambient temperature (whereby the product is not subject to any thermal loading), that the product is of greater purity (impurities can be separated with the solvent), that no hydrogen is formed, and that the ammonia, which is free of hydrogen, can be recovered.

The invention is further exemplified with the aid of the following examples.

EXAMPLE 1

Preparation of Lithium Bronze in Hexane 1.39 g granulated lithium (0.2 mol) were placed in 150 ml hexane in a 500 ml double jacket reactor at 20° C. The ammonia (0.8 mol, approximately 20 liters) was introduced in an amount that it would be absorbed and as far as possible would not escape. The start of the reaction could be recognized by the heat of the solution and by the discolouration of the lithium surface from silvery to bronze colours. The resultant heat of the reaction was dissipated by jacket cooling. When all the lithium had liquefied to lithium bronze (after approximately 3 hours), the addition of ammonia was terminated. A 2-phase liquid solvent system was obtained in which the copper-coloured lithium bronze floated on the surface.

EXAMPLE 2

Preparation of Li-amide with Styrene 11.5 ml (0.1 mol) styrene was added in measured doses within 115 minutes to the 2-phase system of 0.2 mol lithium bronze in 150 ml hexane from Example 1 at a temperature of 20° C. With recatescence, Li-amide and 0.6 mol $NH_3$ (approximately 15 l), which was released continuously, were formed. The reaction preparation was subsequently stirred until no more lithium bronze floated. The light-grey Li-amide formed a sediment on the base when stirring stopped; the supernatant hexane solution was colourless and clear. The reaction preparation was filtered by way of a G-3 filter and washed with 3×20 ml hexane; the filter residue was dried under an oil-pump vacuum at ambient temperature. The lithium amide that was obtained was 5.5 g white powder; the isolated yield was 98%, the purity 97.5%.

EXAMPLE 3

Preparation of Lithium Bronze in Diethyl Ether

In a manner analogous with that of Example 1, 2.36 g granulated lithium (0.34 mol) was reacted with 1.36 mol NH3 (approximately 33 l) within 2 hours and 15 minutes in 250 ml diethyl ether at 20° C. The lithium bronze floated on the surface in a very pure form.

EXAMPLE 4

Preparation of Li-amide with Isoprene

In a manner analogous with Example 2, 17 ml isoprene (0.17 mol) was added in measured doses within 3 hours to the 2-phase system of 0.34 mol lithium bronze in 250 ml diethyl ether, from Example 3, at 20° C. 1.02 mol (approximately 24.4 1) $NH_3$ was thereby released. The lithium amide that was formed precipitated with a light grey colour, was filtered off and dried under an oil-pump vacuum. 7.8 g pure lithium amide with a purity of >99% was obtained.

What is claimed is:

1. Method for preparing lithium amide comprising reacting lithium metal with ammonia to form lithium bronze in a first method step, and reacting the lithium bronze with a 1,3-diene or an arylolefin in the presence of a solvent in a second method step.

2. A method according to claim 1, wherein said 1,3-diene or the arylolefin is selected from the group consisting of butadiene, isoprene, piperylene, dimethylbutadiene, hexadiene, styrene, methyl styrene, naphthalene and anthracene.

3. A method according to claim 1, wherein a stoichiometric quantity of 1,3-diene or arylolefin in relation to the lithium bronze is used in the second reaction step.

4. A method according to claim 1, wherein the first method step is also carried out in the presence of a solvent.

5. A method according to claim 1, wherein said solvent is selected from the group consisting of an acyclic aliphatic hydrocarbon, cyclic aliphatic hydrocarbon, an aromatic hydrocarbon and an ether.

6. A method according to claim 5, wherein said solvent is selected from the group consisting of pentane, cyclopentane, hexane, heptane, octane, cyclohexane, toluene, xylene, cumene, ethyl benzene, tetralin, diethyl ether, tetrahydrofuran (THF), 2-methyl-THF, tetrahydropyrane, diisopropyl, ether, dibutyl ether, dioxan, methyl-tert-butyl ether, glycol ether and mixtures thereof.

7. A method according to claim 1, wherein both method steps are carried out at temperatures of 0 to 30° C.

8. A method according to claim 1, wherein the ammonia that is released is recovered.

* * * * *